United States Patent Office 3,472,004
Patented Oct. 14, 1969

3,472,004
METHOD OF HARVESTING COTTON
William A. Erby, Alburtis, and William E. Erner, Allentown, Pa., Johann S. Skaptason, Stillwell, Kans., and Robert A. Walde, Emmaus, Pa., assignors to Air Products and Chemicals, Inc., Philadelphia, Pa., a corporation of Delaware
No Drawing. Filed Apr. 24, 1967, Ser. No. 632,937
Int. Cl. A01d 45/18; A01n 23/00
U.S. Cl. 56—1                          9 Claims

ABSTRACT OF THE DISCLOSURE

Application of effective amounts of a particular polychloro-4-keto unsaturated acid to cotton plants, in situ causes a rapid wilting followed by defoliation and/or desiccation, depending upon the dosage and conditions of application. First picking from wilted plants can take place within 4 to 12 hours after application and subsequent pickings may be made after defoliation occurs.

BACKGROUND OF THE INVENTION

Field of the invention

This invention relates to the regulation of plant function with an organic compound. More particularly, it relates to a method of harvesting cotton which utilizes the plant growth regulating characteristics of a particular polychloro keto alkenoic acid.

Description of the prior art

The picking of cotton was originally a hand operation extending over several weeks of time as cotton bolls successively ripened and burst open. Today, however, particularly in countries such as the United States where labor is scarce and expensive, mechanical harvesting techniques are used extensively.

There are two general types of cotton harvesting equipment. The first of these is termed a stripper or sled which picks all of the cotton in a field regardless of the degree of boll development. The second type of machine is the spindle picker which is more selective than a stripper and is designed to pick open bolls and windup the seed cotton which comes away from the boll easily. Nevertheless, this type of picker, though more selective than the stripper, produces more trash than in hand-picked cotton. There are also currently under development pickers termed brush pickers which, for purposes of this invention, may be classified with spindle pickers.

When stripper pickers are used, particularly in parts of Texas and Oklahoma, it is customary to treat the crop with chemical desiccants. Use of such materials kills the plant and causes the trash gathered with cotton (e.g. leaves, twigs, burs, unopened immature bolls, etc.) to be relatively dry so that the cotton can be stored safely prior to ginning. Chlorophyl staining is also reduced. An inexpensive desiccant which is widely used for this purpose is arsenic acid. This material, though having the advantage of being low in cost, has an extremely high toxicity.

When cotton is to be picked using a spindle picker, it is customary to treat the crop with a defoliant rather than a desiccant. Such materials cause leaf abscission resulting in defoliation, which in turn assists in the rapid opening of mature bolls, gives good spindle contact with the lint in open bolls and keeps the trash in the picked cotton at an acceptably low level by elimination of the leaves. Further, defoliants also reduce excessive moisture in harvested seed cotton. A common defoliant for this purpose is S,S,S-tributyl phosphorotrithioate. Preparation of this material is described in U.S. Patent #2,943,107 and its use for defoliation is described in U.S. Patent #2,965,467.

Current defoliants, such as the one described above, are applied from seven to fourteen days prior to the projected date for picking. During this waiting period, growth is retarded. The grower, while awaiting defoliation action, is at the mercy of the elements and can lose all or part of his crop.

In an attempt to overcome these difficulties, bottom defoliation is sometimes used. Defoliant is selectively applied to the lower part of the plant (where the mature bolls are first found), the defoliant is allowed to take effect, the bottom crop is picked (e.g. by removing several top rows of spindles from a picker) and some weeks thereafter defoliant may again be applied for complete defoliation. This technique, while permitting multiple picking to increase the yield of quality cotton, increases the length and number of weather-vulnerable periods. Further, two applications of defoliant chemical may be necessary and the labor cost of the first application not only represents an additional expense but is also more difficult than applications where broad sprays can be used over the entirety of the plant.

Summary of the invention

Briefly summarized, the invention relates to a method of harvesting cotton which comprises application, in situ, of an amount of 2,3,5,5,5-pentachloro-4-keto pentenoic acid sufficient to cause wilting to occur within about 4 to about 24 hours and defoliation to occur thereafter within 6 to about 14 days from the time of application. Generally, the effective amount of active ingredient necessary to achieve these desired results ranges from about 1 to about 6 pounds per acre. Mature cotton bolls are preferably picked as soon as wilting occurs to yield a high quality crop and the field may be picked at least once again after the occurrence of defoliation to yield additional cotton. Application rates of active ingredient, on the order of 6 to 8 pounds per acre, produce wilting followed by desiccation so that the second picking may be a stripping operation if desired. While various techniques are available, the active ingredient is preferably applied either as a water dispersible or a spontaneously emulsifiable formulation containing about 35% by weight of the active ingredient (e.g., pentenoic acid).

It will, consequently, be apparent that an object of the invention is to provide a method of harvesting cotton which permits a first picking of high quality cotton, within a relatively few hours after application of the harvest aid, and thus minimizes and effectively eliminates the risk-taking period between harvest aid application and picking.

An additional object of the invention is the provision of a harvesting method whereby a high quality first cotton crop can be obtained under wilt conditions soon after application of a harvesting aid to the plants and where, thereafter, additional cotton can be harvested without renewed spraying. This effect is a novel concomitant of the nature of the invention.

Still another object of the invention is to provide a process which, by adjustment of application rates, can provide either (a) wilting and (b) defoliation or (a) wilting and (b) desiccation with less residual toxicity than with arsenic acid.

Other objects of the invention are the provision of a cotton harvesting method which relies upon the predictable and unique response of cotton plants to said polychloro pentenoic acid, which permits better planning of harvest schedules, which improves the quality of picked cotton, which lengthens the effective growing season because plant growth is not halted until a few hours before picking, which optimizes cotton yield and which gives the grower an effective tool for increasing profits.

These and other objects of the invention will be apparent to those skilled in the art from a consideration of the exemplary description which follows. It should be appreciated that neither the abstract of the disclosure nor the summary of the invention above is intended to constitute a limitation on its extent. They are inserted merely as aids in information retrieval and therefore the true scope of the invention is to be determined only by a reasonable interpretation of the appended claims in light of the following description.

DESCRIPTIONS OF THE PREFERRED EMBODIMENTS

The active ingredient used in the instant invention is a composition comprising predominantly cis-2,3,5,5,5-pentachloro-4-keto pentenoic acid. The compound may be represented by the following structural formula:

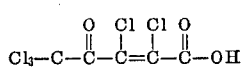

Preparation of this compound is the subject matter of co-pending patent application, Ser. No. 541,096 filed on Apr. 8, 1966 by William A. Erby and Robert A. Walde, two of the inventors of the instant invention. Briefly, the compound may be prepared by the direct chlorination of levulinic acid over an extended period of time while raising the temperature gradually from about 50° C. to a temperature in the region of about 250° C. Reaction products contain the above-identified compound along with related organic compounds. A typical active ingredient used for practicing the invention comprises 90.4 wt. percent cis-2, 3,5,5,5-pentachloro-4-keto pentenoic acid, 2.0% dichloromaleic anhydride and 7.6% tetrachloro-4-keto pentenoic acid. As used herein, the term "active ingredient" means a composition of this type.

Solid compositions may be prepared in the form of dusts, wettable powders or granules by mixing the active ingredient with a surfactant and/or one or more finely divided solid carriers such as, for example, talc, clay, pyrophyllite, silica and fuller's earth. Solid compositions may be applied directly to the plants or dispersed in water and applied as an aqueous dispersion. Alternatively, the active ingredient can be prepared as a liquid concentrate for dispersion in a larger body of liquid. Solvents such as xylene, alkylated naphthalene and other hydrocarbons or mixtures thereof may be used in such concentrates. Suitable emulsifying agents may also be utilized such as the isopropyl amine salts of $C_8$–$C_{14}$ alkyl benzene sulfonates and other conventional emulsifying agents. Solubility of the active ingredient in such formulations may be further increased by the addition of glycols such as ethylene and/or propylene glycol as well as oxyethylated and/or oxypropylated derivatives thereof. Surfactants found particularly beneficial for making spontaneously emulsifiable formulations are mixtures of long chain emulsifying organic acids and highly oxyethylated long chain alcohols. All of these formulations as well as equivalent formulations serve to provide a convenient means for conveying the desired quantity of active ingredient to the plant body.

Two formulations, exemplary of those which may be used in the practice of the invention, are given below. Formula I is for a spontaneously emulsifiable liquid and Formula II is for a water dispersible liquid.

FORMULA I

| | Percent by weight |
|---|---|
| Active ingredient | 35 |
| Propylene glycol | 10 |
| Emulsifier | 6.5 |
| Xylene | 48.5 |
| | 100.0 |

FORMULA II

| | Percent by weight |
|---|---|
| Active ingredient | 35 |
| Propylene glycol | 10 |
| Emulsifier (isopropyl amine salt of dodecyl benzene sulfonate) | 6.5 |
| Xylene | 48.5 |
| | 100.0 |

Both of the above formulations contain about three pounds per gallon of active ingredient and formulations can be varied to provide a range of concentrations of active ingredient from about 2 to above about 4 pounds per gallon. These liquid formulations are diluted with water to provide solutions suitable for spraying by either aircraft or ground equipment.

Application can be made at any time of day and under any leaf conditions, although results are best when leaves are warm and dry. Low temperatures will not affect wilting but will decrease the speed of defoliation. A preferred dosage range, for wilting followed by defoliation, is from 1 to 6 pounds of active ingredient per acre using spray volumes of 3 to 15 gallons of ultimate solution per acre for air application and 5 to 30 gallons per acre for ground application. Within these limits wilting first reaches harvest conditions in from 4 to 24 hours and defoliation reaches its maximum of from 70 to 100% in from 6 to 14 days depending upon environmental conditions and application rates. These rates are directly proportional to the size of the plants.

As stated above, cotton can be picked as soon as wilting takes place. The first wilting action observed on a leaf is the formation of white spots which eventually spread and completely denature the leaf chlorophyl. Leaf moisture decreases from about 80% to about 60%. Modification of cell structure results in an extremely pliable leaf which can be exposed to mechanical action without breaking or cracking; whereas the green, untreated leaf breaks up and exudes chlorophyl. The leaf petiole also becomes pliant and the leaves hang down and pucker. In this wilted condition, the moisture in the cotton and the physical properties of the leaves are ideal for spindle picking. It has also been noted that the wilted leaves seem to have a lubricating effect upon the spindle action. It is preferred to pick as soon as wilting occurs since, with lapse of time, petiole attachment weakens as defoliation approaches.

The active ingredient is non-selective as to wilting and will wilt large weeds growing in cotton rows. These weeds are thus prevented from interfering with harvesting and from staining the cotton. Additionally, some insecticidal effect has been evidenced vis-a-vis the boll weevil and the boll worm.

While generally not necessary or particularly advantageous, it is possible to use the method of the invention with respect to the bottom of the plants only. About one half the dosage rates indicated above are used and application of the spray is to the bottom of the plant only. Plant growth is not interfered with and the bolls continue to mature and may be picked when wilted and/or defoliated.

When wilting followed by desiccation is desired the dosages are increased, generally to from above about 4 pounds per acre to about 8 pounds per acre of active ingredient. Most often a dose of about six pounds per acre is found effective for this purpose.

Obviously, many modifications and variations of the invention as herein before set forth may be made without departing from the spirit and scope thereof, and therefore only such limitations should be imposed as are indicated in the appended claims.

What is claimed is:
1. A method of harvesting cotton comprising the steps of:
   (a) spraying on cotton plants, in situ, a composition comprising 2,3,5,5,5 pentachloro-4-keto pentenoic acid in an amount effective to cause wilting to occur within 4 to 24 hours after spraying, and
(b) picking cotton from the plants in their wilted condition.

2. The method of claim 1 wherein the amount of said polychloropentenoic acid applied ranges from above about 1 to below about 8 pounds per acre.

3. The method of claim 1 wherein, further, the amount of said acid applied is also effective to cause subsequent defoliation of the plants to occur from within 6 to about 14 days after spraying and wherein
(c) cotton is again picked from the cotton plants when they are in defoliated condition.

4. The method of claim 3 wherein the amount of said acid applied ranges from about 1 to about 6 pounds per acre.

5. The method of claim 1 wherein, further, the amount of said composition applied is also effective to cause subsequent desiccation of the plants to occur after wilting and wherein
(d) the cotton plants are picked in their desiccated condition.

6. The method of claim 5 wherein the amount of said pentenoic acid applied ranges from above about 4 to about 8 pounds per acre.

7. A method of harvesting cotton comprising the steps of:

(a) applying to cotton plants, in situ, a composition comprising 2,3,5,5,5 pentachloro-4-keto pentenoic acid in an amount whereby wilting occurs within four to twenty-four hours after application and defoliation occurs from within six to about fourteen days after application;
(b) harvesting substantially all of the cotton within about fourteen days after the application of said composition.

8. The method of claim 7 wherein a first portion of the cotton is harvested when the cotton plant is in wilted condition.

9. The method of claim 8 wherein at least one additional portion of cotton is harvested when the plant is in defoliated condition.

References Cited
UNITED STATES PATENTS

| | | | |
|---|---|---|---|
| 3,174,267 | 3/1965 | Bopf | 56—44 |
| 3,238,667 | 3/1966 | Remmert | 47—1.7 |
| 3,238,668 | 3/1966 | Abbott et al. | 47—1.7 |
| 3,335,552 | 8/1967 | James | 56—1 |

RUSSELL R. KINSEY, Primary Examiner

U.S. Cl. X.R.

47—1.7